(12) United States Patent
Choo et al.

(10) Patent No.: US 8,688,179 B2
(45) Date of Patent: Apr. 1, 2014

(54) MOBILE TERMINAL

(75) Inventors: Zhimin Choo, Gyeonggi-Do (KR); Daeyong Kwak, Gyeonggi-Do (KR); Sanghyun Choi, Seoul (KR); Hophil Lee, Gyeonggi-Do (KR); Kangjae Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 13/476,800

(22) Filed: May 21, 2012

(65) Prior Publication Data

US 2012/0309473 A1    Dec. 6, 2012

(30) Foreign Application Priority Data

Jun. 1, 2011    (KR) ........................ 10-2011-0053005

(51) Int. Cl.
     *H04M 1/00*          (2006.01)

(52) U.S. Cl.
     USPC ...................................................... 455/575.7

(58) Field of Classification Search
     USPC ............ 455/550.1, 575.1, 575.7, 575.8, 128, 455/129, 269, 347; 361/748, 814
     See application file for complete search history.

(56) References Cited

U.S. PATENT DOCUMENTS

| | | | |
|---|---|---|---|
| 5,086,509 A | | 2/1992 | Inubushi et al. |
| 8,396,521 B2 * | | 3/2013 | Horimoto et al. .......... 455/575.7 |

FOREIGN PATENT DOCUMENTS

| | | |
|---|---|---|
| JP | 2006129038 | 5/2006 |
| JP | 2009004875 | 1/2009 |
| KR | 10-2011-0008606 | 1/2011 |

* cited by examiner

*Primary Examiner* — Nguyen Vo
(74) *Attorney, Agent, or Firm* — Lee, Hong, Degerman, Kang Waimey

(57) ABSTRACT

A mobile terminal includes a terminal main body including a circuit board for processing a radio signal, a conductive member including an exposed surface exposed to the outside of the main body and a plurality of recesses formed to be recessed toward the interior of the main body from the exposed surface and disposed to be spaced apart, at least a portion thereof being formed to transmit and receive the radio signal, and a filling member forming an external appearance of the main body and filling the recess portions.

17 Claims, 12 Drawing Sheets

MOBILE TERMINAL

CROSS REFERENCE TO RELATED APPLICATIONS

The present application claims priority to Korean Application No. 10-2011-0053005 filed in Korea on Jun. 1, 2011, the entire contents of which is hereby incorporated by reference in its entirety.

BACKGROUND OF THE INVENTION

1. Field of the Invention

The present invention relates to a mobile terminal having an antenna device transmitting and receiving a radio signal.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, terminals can support more complicated functions such as capturing images or video, reproducing music or video files, playing games, receiving broadcast signals, and the like. By comprehensively and collectively implementing such functions, terminals may be embodied in the form of a multimedia player or device.

In order to implement various functions of such multimedia players or devices, various attempts are being made and implemented in terms of hardware or software. For example, a user interface allowing users to easily and conveniently search for and select one or more functions is provided.

In addition, as users consider their mobile terminals as personal belongings to express their personality, mobile terminals are expected to have various designs. The designs may include a structural change and enhancement allowing users to conveniently use mobile terminals.

An antenna device and a design of an external appearance in relation to the antenna device may be considered as one of such structural changes and improvement.

SUMMARY OF THE INVENTION

An aspect of the present invention provides a mobile terminal having an antenna device implemented in a small space.

Another aspect of the present invention provides a mobile terminal in which a portion exposed to the outside is designed to be different from that of the related art.

According to an aspect of the present invention, there is provided a mobile terminal including: a terminal main body including a circuit board for processing a radio signal; a conductive member including an exposed surface exposed to the outside of the main body and a plurality of recesses formed to be recessed toward the interior of the main body from the exposed surface and disposed to be spaced apart, at least a portion of the conductive member being formed to transmit and receive the radio signal; and a filling member forming an external appearance of the main body and filling the recess portions.

A metal member may be disposed on the main body to form a gap with the conductive member, and the gap may be filled by the filling member.

The metal member may include a metal exposed surface and metal recess portions. The metal exposed surface is exposed to the outside of the main body and formed to be continued from the exposed surface. The metal recess portions are formed to be recessed toward the interior of the main body from the metal exposed surface and disposed to be spaced apart. The exposed surface and the metal exposed surface may be formed on the external source of the main body, respectively.

In another example in relation to an embodiment of the present invention, the filling member may be configured to surround the conductive member and the metal member together such that the recess portions, the gap, and the metal recess portions are filled. The filling member may include a plurality of slots disposed to be spaced apart along the outer circumference of the main body, and the exposed surface and the metal exposed surface may be disposed in the slots.

In another example in relation to an embodiment of the present invention, the filling member may include a plurality of slots, and at least one of the plurality of slots may be configured as a through hole for discharging a sound.

In another example in relation to an embodiment of the present invention, the metal member and the conductive member may be made of the same material, and the filling member may be made of a synthetic resin material. The metal member and the conductive member may be coupled with the filling member through in-mold molding.

In another example in relation to an embodiment of the present invention, an antenna module may be installed within the main body, and the antenna module may include a conductor connected to the circuit board so as to be fed, and a connection terminal connecting the conductor and the conductive member to generate a conductive path formed by the circuit board, the conductor, and the conductive member.

In another example in relation to an embodiment of the present invention, the metal member may include a frame portion formed along a lateral portion of the main body and an extending portion extending to the interior of the terminal from the frame portion. A recess may be formed to be recessed toward the interior of the main body to allow the conductive member to be disposed therein.

In order to extend a ground of the circuit board, the extending portion may be electrically connected to the circuit board. The extending portion may be formed to cover a rear surface of main body in a thickness direction or may be formed to allow an electronic element installed in the main body to be mounted thereon.

In another example in relation to an embodiment of the present invention, the conductive member may include first and second conductive members for transmitting and receiving radio signals of different frequency bands, and the first and second conductive members may be disposed to face in different directions.

In addition, an aspect of the present invention provides a mobile terminal including: a terminal main body; a conductive member including a plurality of protrusions disposed with first separation spaces formed therebetween and exposed to the outside of the main body; a metal member including a plurality of metal protrusions disposed with second separation spaces formed therebetween and forming a gap with the conductive member; and a filling member formed to fill the gap along with the first separation spaces and the second separation spaces to couple the conductive member and the metal member.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like.

Figure 1:
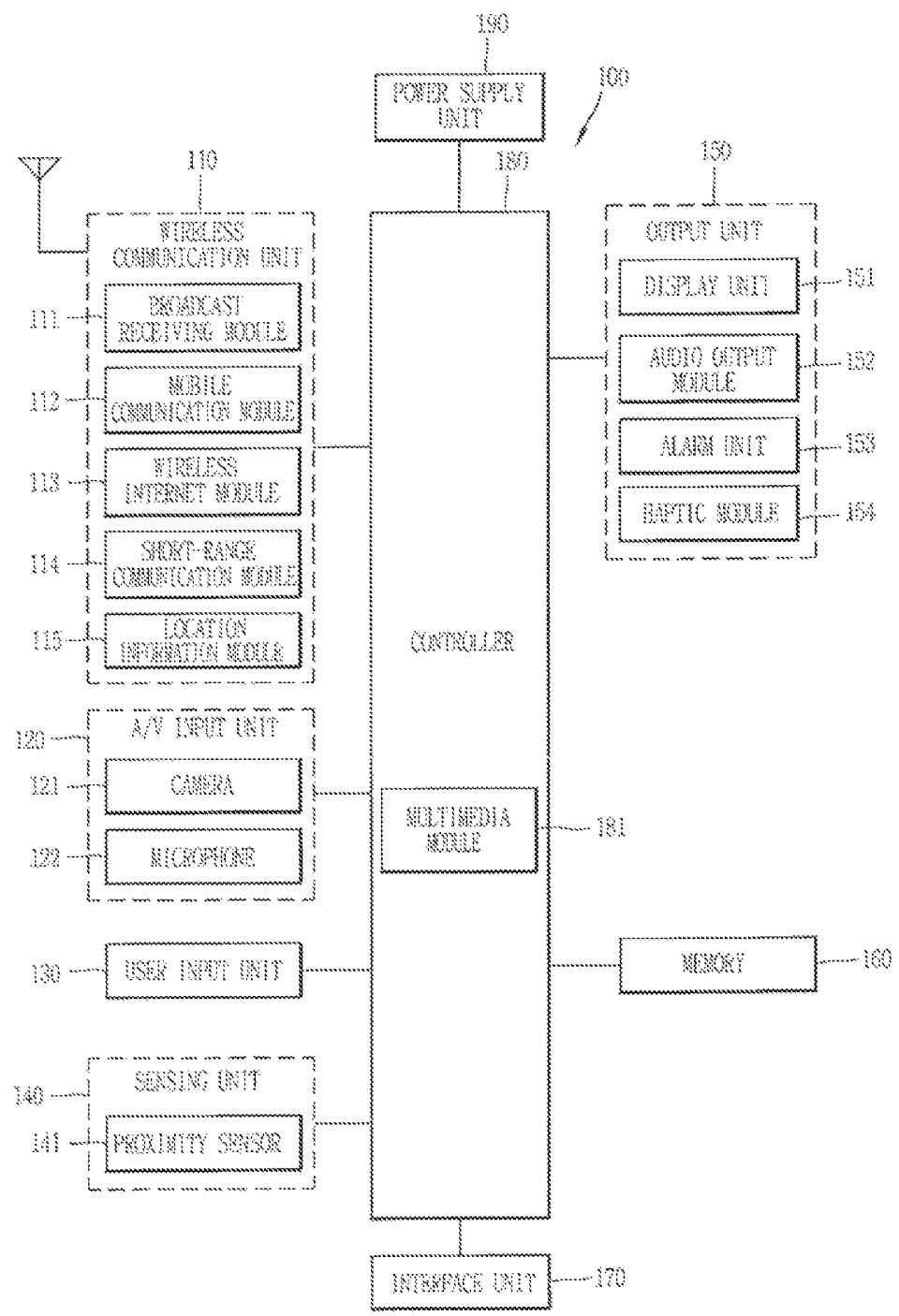
FIG. 1 is a schematic block diagram of a mobile terminal related to an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
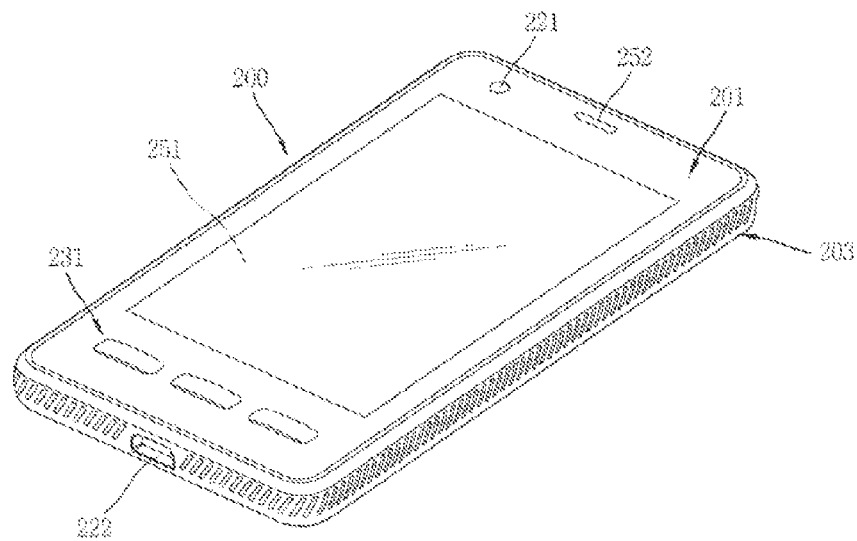
FIG. 2A is a front perspective view of the mobile terminal related to an embodiment of the present invention.
Figure 2B:
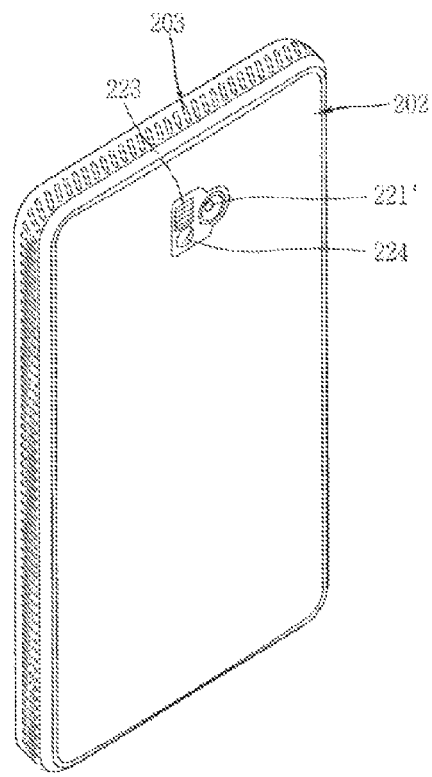
FIG. 2B is a rear perspective view of the mobile terminal illustrated in FIG. 2A.

FIG. 2A is a front perspective view of the mobile terminal according to an embodiment of the present invention, and FIG. 2B is a rear perspective view of the mobile terminal illustrated in FIG. 2A.

The disclosed mobile terminal 200 has a bar type terminal body. However, without being limited thereto, the present invention can be also applicable to a slide type mobile terminal, a folder type mobile terminal, a swing type mobile terminal, a swivel type mobile terminal and the like, including two or more bodies.

The terminal body includes a case (or casing, housing, cover, etc.) constituting an external appearance of the terminal body. In the present exemplary embodiment, the case may be divided into a front case 201 and a rear case 202. Various electronic components are installed in the space between the front case 201 and the rear case 202. One or more intermediate cases may be additionally disposed between the front case 201 and the rear case 202.

The cases may be formed by injection-molding a synthetic resin or may be made of a metallic material such as stainless steel (STS) or titanium (Ti), etc.

A display module 251, an audio output module 252, a camera 221, and a user input unit 230 (231, 232), a microphone, an interface 222, and the like, may be located on the terminal body, namely, mainly, on the front case 201.

The display module 251 occupies the most portion of the front surface of the front case 201. The audio output unit 252 and the camera 221 are disposed at a region adjacent to one of both end portions of the display module 251, and the user input unit 231 and the microphone (not shown) are disposed at a region adjacent to another of the both end portions. The user input unit 232, the interface 222, and the like, may be disposed on the sides of the front case 201 and the rear case 202.

The user input unit 230 is manipulated to receive commands for controlling the operation of the mobile terminal 200, and may include a plurality of manipulation units 231 and 232. The manipulation units 231 and 232 may be generally called a manipulating portion, and they can employ any method so long as they can be manipulated in a tactile manner by the user.

Content inputted by the first and second manipulation units 231 and 232 may be variably set. For example, the first manipulation unit 231 receives commands such as start, end, scroll, or the like, and the second manipulation unit 232 may receive commands such as adjustment of size of a sound outputted from the audio output unit 252 or conversion to a touch recognition mode of the display module 251. The display module 251 constitutes a touch screen along with the touch sensor, and the touch screen may be an example of the user input unit 230.

With reference to FIG. 2B, a camera 221' may additionally be disposed on a rear surface of the terminal body, namely, on the rear case 202. The camera 221' may have an image capture direction which is substantially opposite to that of the camera 221 (See FIG. 2A), and may support a different number of pixels (i.e., have a different resolution) than the camera 221.

For example, camera 221 may operate with a relatively lower resolution to capture an image(s) of the user's face and immediately transmit such image(s) to another party in real-time during video call communication or the like. Meanwhile, the camera 221' may operate with a relatively higher resolution to capture images of general objects with high picture quality, which may not require immediately transmission in real time. The cameras 221 and 221' may be installed on the terminal such that they are rotated or popped up.

A flash 223 and a mirror 224, may be additionally disposed adjacent to the camera 221'. When an image of the subject is captured with the camera 221', the flash 223 illuminates the subject. The mirror 224 allows the user to see himself when he wants to capture his own image (i.e., self-image capturing) by using the camera 221'.

An audio output unit may be additionally disposed on the rear surface of the terminal body. The audio output unit may implement a stereoscopic function along with the audio output unit 252 (See FIG. 2A), and may be used for implementing a speaker phone mode during call communication.

A power supply unit for supplying power to the mobile terminal 200 may be mounted on the terminal body in order to supply power to the mobile terminal 200. The power supply unit may be installed in the terminal body or may be directly detached from the outside of the terminal body.

A touch sensor may be additionally mounted on the rear case 202 to detect a touch. The touch sensor may be configured to be light-transmissive like the display module 251. In this case, when the display module 251 is configured to output visual information from both sides, the visual information can be recognized also through the touch sensor 235. The information outputted from both sides can be controlled by the touch sensor 235. Alternatively, a display may be additionally mounted on the touch sensor 235, so a touch screen may also be disposed on the rear case 202.

The touch sensor is operated in relation to the display module 251 of the front case 201. The touch sensor may be disposed to be parallel to the rear side of the display module 251. The touch sensor 235 may have a size which is the same as or smaller than the display module 251.

An antenna for a call, or the like, may be mounted in the terminal main body, and in addition, a broadcast signal receiving antenna, a Bluetooth antenna, a satellite signal receiving antenna, a data receiving antenna of the wireless Internet, or the like, may also be disposed on the terminal body.

These antennas may be combined to form an antenna device that may be able to collectively provide various communication services, and to this end, the antenna device has an antenna pattern for transmitting and receiving a radio signal.

A configuration in which the antenna pattern is exposed to the outside of a terminal body will be described as an example.

Figure 3:
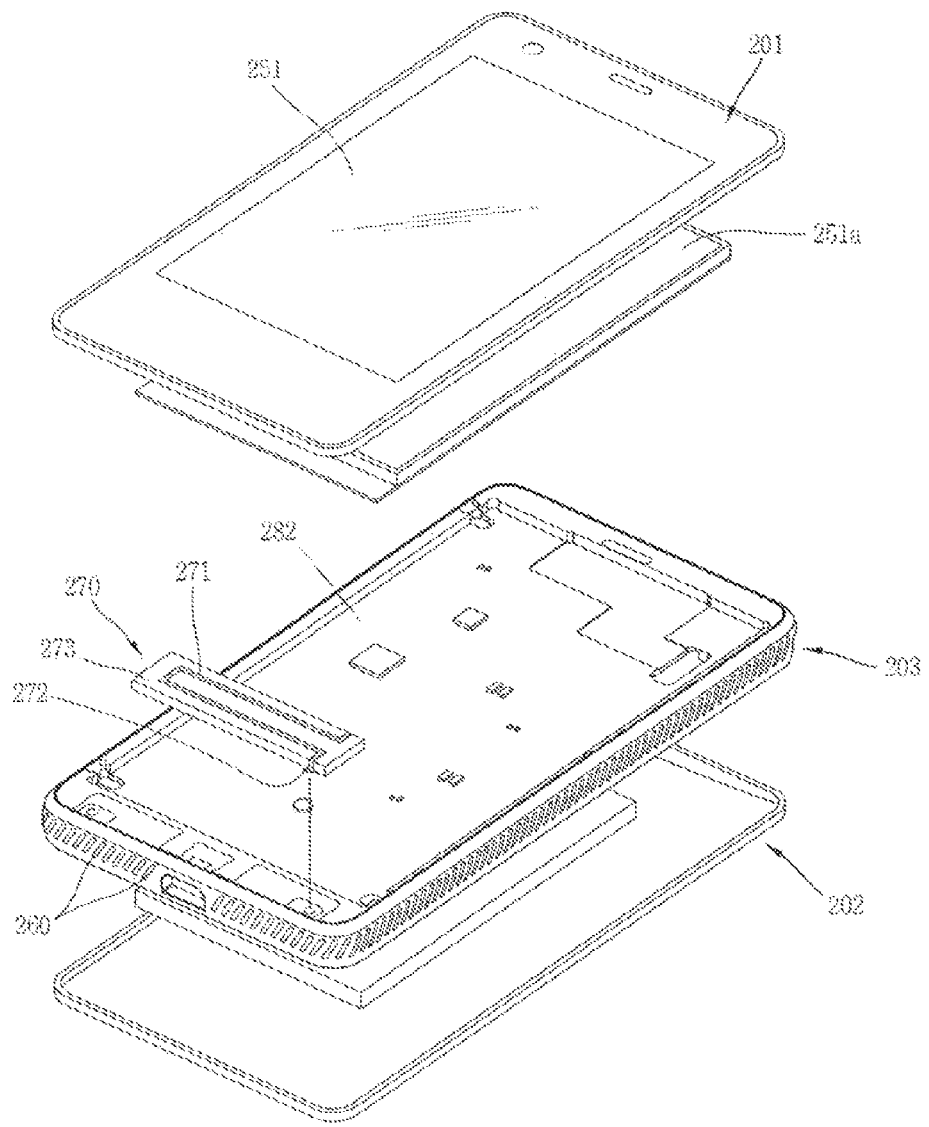
FIG. 3 is an exploded view of the mobile terminal of FIG. 2B.
Figure 4:
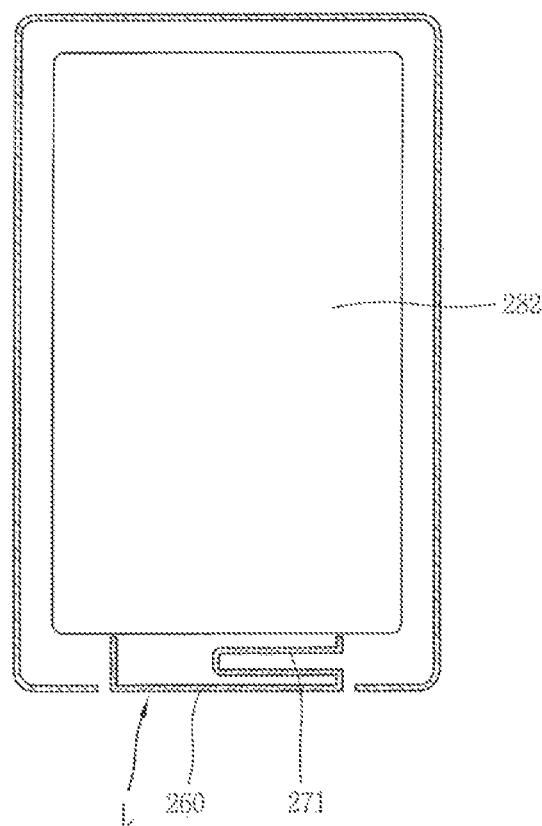
FIG. 4 is a conceptual view of an antenna device in FIG. 3.
Figure 5:
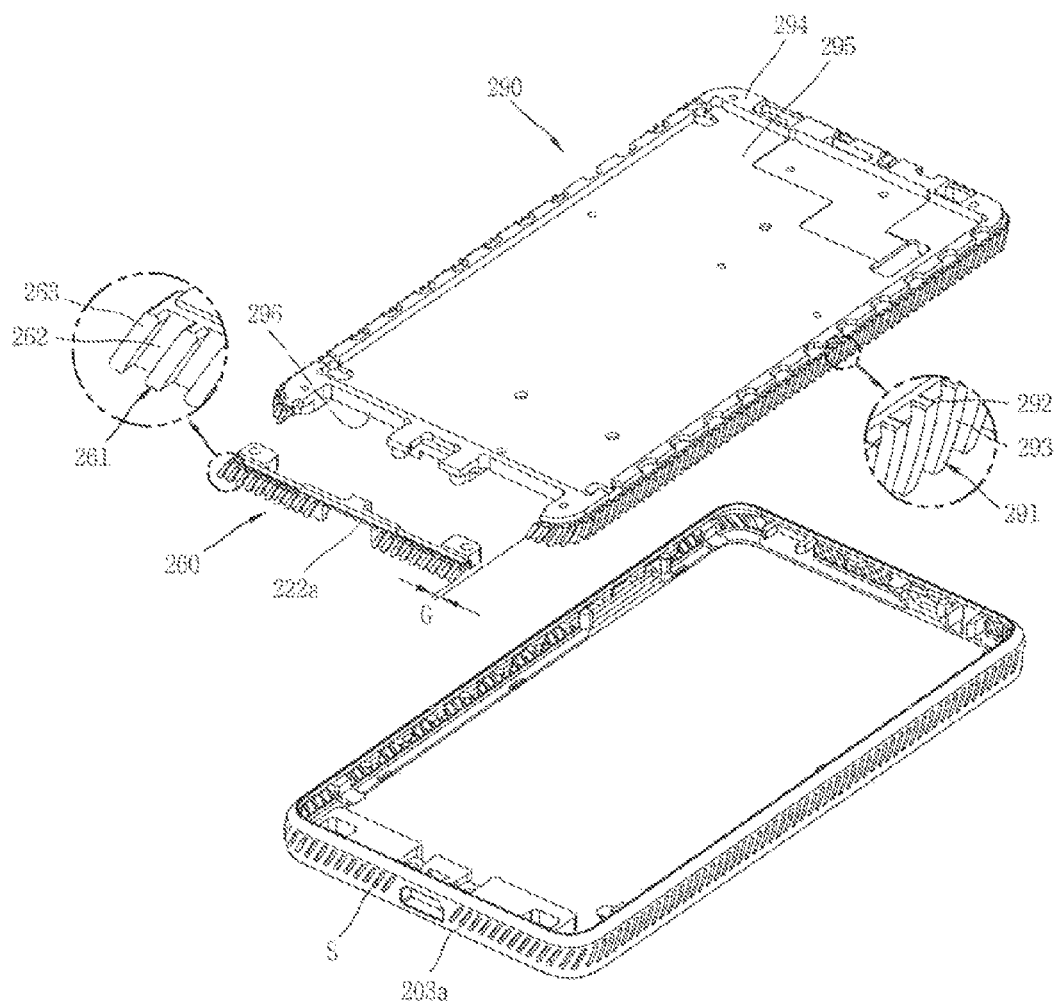
FIG. 5 is an exploded view of a lateral case in FIG. 3.

FIG. 3 is an exploded view of the mobile terminal of FIG. 2B. FIG. 4 is a conceptual view of an antenna device in FIG. 3. FIG. 5 is an exploded view of a lateral case in FIG. 3.

With reference to FIG. 3, an external appearance of the terminal body is formed as a lateral case 203, a front case 201, and a rear case 202 are coupled.

The display module 251 is mounted on one surface of the front case 201. The display module 251 includes a window and a display element 251a and may be formed to sense a touch input.

As illustrated, a circuit board 282 for controlling the display module 251 is installed in the terminal body. The circuit board 282 may be mounted, for example, in the front case 201, or rear case 202, or may be mounted in any other internal structure. As illustrated, the circuit board 282 is disposed to cover a front surface of the lateral case 203. Hereinafter, a case in which the front case 201, the lateral case 203, and the rear case 202 are separately configured will be described as an example, but the present invention is not limited thereto and some of the cases 201, 202, and 203 may be integrally formed.

The circuit board 282 may be configured as an example of the controller 180 (See FIG. 1) for operating various functions of the mobile terminal. A plurality of circuit boards 282 may be provided and combined to perform the functions of the controller 180. Also, the circuit board 282 is electrically connected to the antenna device to process a radio signal (or a radio electro-magnetic wave) transmitted or received by the antenna device.

As illustrated, a battery as an example of a power supply unit is mounted in the terminal. The battery may be mounted between a rear surface of the lateral case 203 and the rear case 202.

With reference to FIGS. 3 and 4, the antenna device according to an embodiment of the present invention includes a conductive member 260 and an antenna module 270, and the combination of the conductive member 260 and the antenna module 270 forms a conductive loop L.

The conductive member 260 constitutes a portion of the lateral case 203, and is formed to be electrically connected to the antenna module 270. The antenna module 270 is installed within the terminal body. The antenna module 270 includes a conductor 271 and a connection terminal 272.

In detail, the conductor 271 is connected to the circuit board (or ground) so as to be fed. The connection terminal 272 extends from the conductor 271 to come in elastically contact with the conductive member 260 in order to electrically connect the conductor 271 and the conductive member 260. For feeding, a feeding arm may be formed at an end portion of the conductor 271.

A radio signal is transmitted and received through a conductive path formed by the circuit board 282, the conductor 271, and the conductive member 260. In this case, the conductive member 260 serves to scatter or radiate electromagnetic waves in the air. Also, the conductor 271 may be mounted on a carrier 273, and the carrier 273 may be formed such that at least a portion thereof overlaps with the conductive member 260.

According to this structure, a portion of the antenna pattern is disposed within the terminal and another portion of the antenna pattern is disposed on the lateral case, reducing the size of the antenna device, and thus, making the terminal thinner. Namely, the antenna device is implemented to have such a structure in which the antenna device is divided into two parts; One of the two parts is positioned on the existing carrier 273 and the other is integrated with the case, and as a result, the volume of the antenna can be reduced.

Also, in the antenna device according to an embodiment of the present invention, only a portion of the conductive member 260 disposed on the lateral case is exposed, whereby external influence (e.g., user contact) on the antenna pattern can be reduced.

Hereinafter, a detailed structure of the lateral case 203 along with the conductive member 260 will be described. With reference to FIGS. 3 and 5, the conductive member 260 includes an exposed surface 261 and recess portions 262.

The exposed surface 261 is a portion exposed to the outside of the terminal body. The exposed surface 261 is exposed in the form of a plurality of parallel slots from the lateral case 203. The recess portions 262 are formed to be recessed toward the interior of the main body and disposed to be spaced apart.

In other words, the exposed surface 261 is formed by a plurality of protrusions 263, and the plurality of protrusions 263 are disposed with first separation spaces formed therebetween and exposed to the outside from the lateral case 203. The first separation spaces may be internal spaces of the recess portions 262.

As illustrated, the recess portions 262 are filled by a filling member 203a. The filling member 203a forms an external appearance of the lateral case 203 and may be made of a non-conductive material, e.g., a synthetic resin, or the like. Namely, the filling member 203a includes a plurality of slots (S, slots of the lateral case) disposed to be spaced apart along the outer circumference of the terminal body, and the exposed surface 261 is disposed in the slots S.

Also, as an example of the interface 222 (in FIG. 2A), a connection terminal recess 222a may be formed on the conductive member 260 to allow a connection terminal (not shown) to be disposed therein. The connection terminal disposed in the connection terminal recess may be fixed by the filling member 203a.

With reference to FIG. 2A along with FIGS. 3 and 5, the slots S continuously appear along the lateral case 203 as well as on a region on which the conductive member 260 is disposed. Such a design may be implemented by a metal member 290 and the filling member 203a.

The metal member 290 forms a portion of the edges of the terminal along with the conductive member 260. For example, the metal member 290 includes a metal exposed surface 291 and metal recess portions 292.

The metal exposed surface is exposed to the outside of the terminal body and formed to be continued from the exposed surface 261. The metal recess portions 292 are formed to be recessed toward the interior of the body from the metal exposed surface 291 and disposed to be spaced apart. Accordingly, the exposed surface 261 and the metal exposed surface 291 may be formed on the external surface of the terminal body, respectively. As illustrated, the filling member 203a includes a plurality of slots disposed to be spaced apart along the outer circumference of the terminal body and the exposed face 261 and the metal exposed surface 291 may be disposed in the slots, respectively.

In detail, protrusion patterns similar to those of the conductive member 260 are formed along the outer circumferential surface of the metal member 290. In other words, the metal member 290 includes a plurality of metal protrusions 293 disposed with second separation spaces formed therebetween.

As illustrated, the metal member 290 is configured to form a gap G with the conductive member 260. The gap G is filled by the filling member 203a. Namely, the filling member 203a is formed to surround the conductive member 260 and the metal member 290 together to fill the recess portions 262, the gap G, and the metal recess portions 292.

The metal member 290 and the conductive member 260 are integrated to the lateral case 203 but exist as separate components by the gap G, and may be electrically disconnected. The size of the gap at a portion exposed to the outside from the lateral case 203 is equal or similar to the distance between the slots S. Accordingly, based on the gap, the exposed surface 261 at one side and the metal exposed surface 291 at the other side may not be discriminated, and in addition, a united pattern is formed on an external portion of the lateral case 203 such that the antenna pattern cannot be recognizable.

Also, the metal member 290 and the conductive member 260 are made of the same material, and the filling member 203a may be made of a synthetic resin material. According to such a combination, a design in which the pattern made of a metal material is regularly formed on the synthetic resin case can be possibly formed.

In addition, the metal member 290 may constitute a frame of the lateral case 203a and serve to fix internal components. With reference to FIG. 5, the metal member 290 includes a frame portion 294 and an extending portion 295.

The frame portion 294 is formed along the side portions of the terminal body and forms the edges of the body. The extending portion 295 extends to the interior of the terminal.

As illustrated, a recess 296 is formed toward the interior of the terminal body to allow the conductive member 260 to be disposed therein. The recess 296 is formed by cutting out one end portion of the frame portion 294, and as the conductive member 260 is disposed on the cutout portion, the metal member 290 and the conductive member 260 form a single rectangular plate.

The extending portion 295 is formed in the form of a plate member to cover a rear surface of the body (rear case) in a thickness direction of the terminal body and allows electronic elements implementing various functions of the terminal to be mounted thereon. The extending portion 295 may be made of a metal material or a portion of the extending portion 295 may be made of a non-metal material. Also, a portion of the extending portion 295 made of a metal material may be electrically connected to the circuit board 292 to extend the ground of the circuit board 292. Also, in order to earth the conductive member 260, one end of the conductive member 260 may be directly connected to the extending portion 295 so as to be grounded.

Figure 6A:
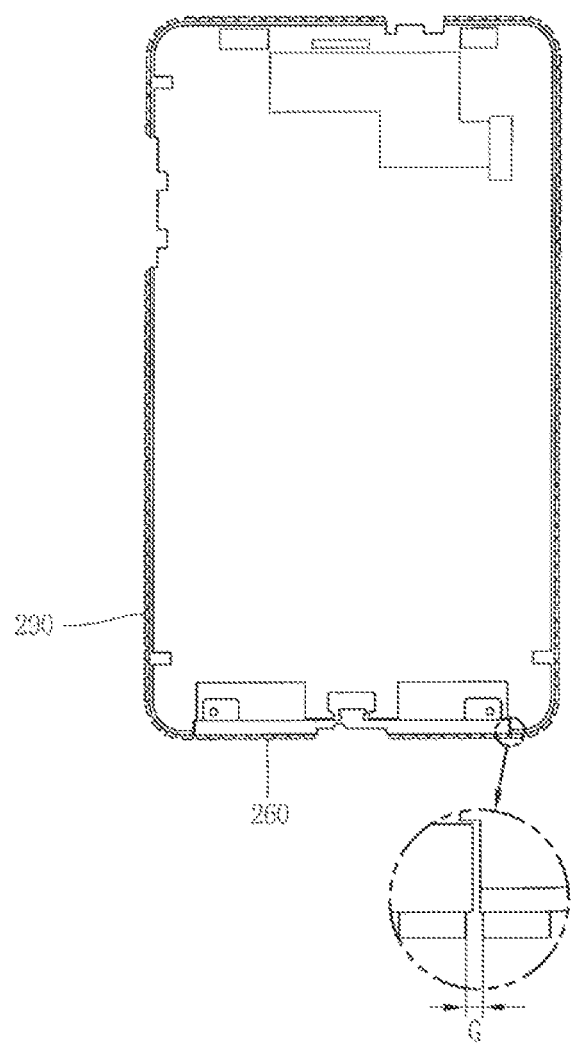
FIGS. 6A and 6B are views showing processes of a method for fabricating the lateral case according to an embodiment of the present invention.
Figure 6B:
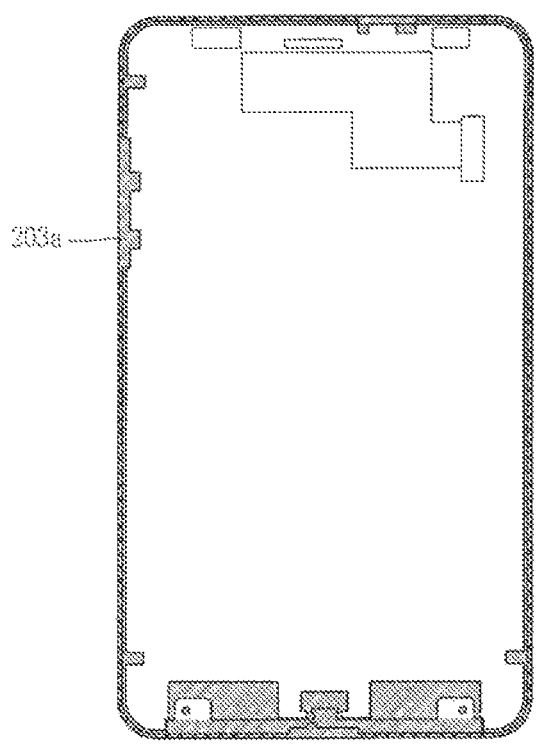

With reference to FIG. 3, the metal member 290 and the conductive member 260 may be coupled by the filling member 203. FIGS. 6A and 6B are views showing processes of a method for fabricating the lateral case according to an embodiment of the present invention.

With reference to these drawings, the filing member 203a is formed to fill the gap G between the conductive member 260 and the metal member 290 as well as the first separation spaces of the conductive member 260 and the second separation spaces of the metal member 290, thus coupling the conductive member 260 and the metal member 290.

For example, as shown in FIG. 6A, through an in-mold molding that in a state in which the conductive member 260 and the metal member 290 are inserted in a mold, the filling member 203a is as shown in FIG. 6B, thus coupling the conductive member 260 and the metal member 290.

To this end, the filling member 203a may be configured to cover a portion excluding the exposed surface 261 of the conductive member 260 and a portion excluding the metal exposed surface 291 of the metal member 290, respectively. In addition, the filling member 203a may be made of a synthetic resin material to couple the conductive member 260 and the metal member 290 through in-molding.

Figure 7:
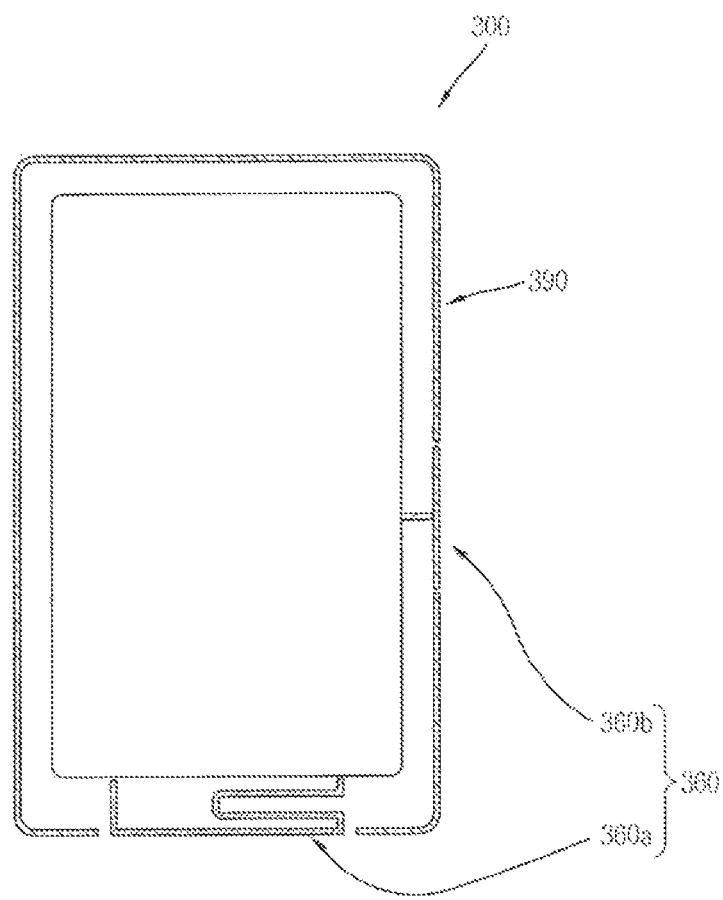
FIG. 7 is a conceptual view showing a mobile terminal related to another embodiment of the present invention.
Figure 8:
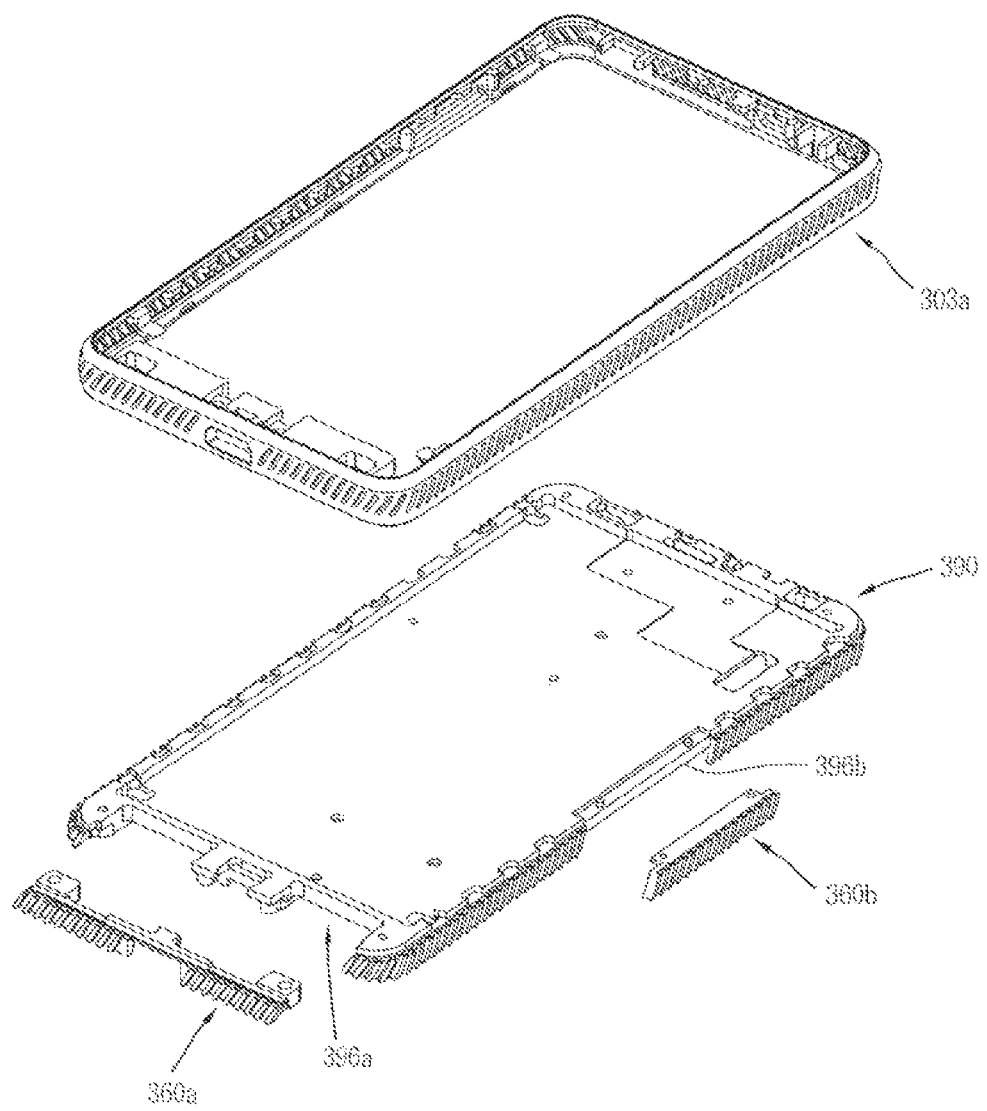
FIG. 8 is an exploded view of the mobile terminal in FIG. 7.
Figure 9A:
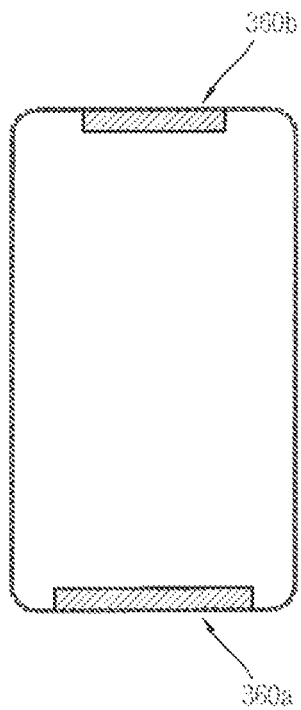
FIGS. 9A and 9B are views showing variants of the mobile terminal in FIG. 7.
Figure 9B:
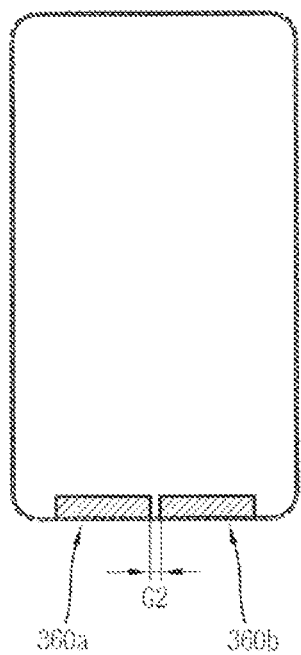

FIG. 7 is a conceptual view showing a mobile terminal related to another embodiment of the present invention. FIG. 8 is an exploded view of the mobile terminal in FIG. 7. FIGS. 9A and 9B are views showing variants of the mobile terminal in FIG. 7. Hereinafter, in describing other embodiments of the present invention, like or similar reference numerals are used for the like or similar elements as those of the former embodiment, and a description thereof will be omitted.

As illustrated, in the mobile terminal, a plurality of antenna patterns are formed on a portion of the lateral case formed along the lateral surface of the terminal body. For example, a conductive member 360 includes first and second conductive members 360a and 360b for transmitting and receiving radio signals of different frequency bands. Namely, the first and second conductive members 360a and 360b are connected to a circuit board (or ground) through different conductive paths so as to be fed.

A plurality of recesses 396a and 396b are formed on the metal member 390 and the first and second conductive members 360a and 360b are disposed on the metal member 390. Accordingly, a lateral case 303 may be able to transmit and receive radio signals of different frequency bands.

As illustrated, the first and second conductive members 360a and 360b are disposed to face different directions. For example, the first and second conductive members 360a and 360b may be disposed to be perpendicular to each other. In this case, the first conductive member 360a may be exposed from a lower end of the terminal, and the second conductive member 230b may be exposed from a lateral end of the terminal.

For example, the first conductive member 360a may be configured as a main antenna for a call of the terminal along with the antenna module 270 (See FIG. 3), and the second conductive member 360b may be configured as an auxiliary antenna for Bluetooth™, wireless LAN, GPS, or the like.

Also, with reference to FIG. 9A, the first and second conductive members 360a and 360b may be disposed to be parallel to each other. In this case, the first and second conductive members 360a and 360b may be exposed to the outside from upper and lower ends of the terminal.

In an embodiment of the present invention, the first and second conductive members 360a and 360b are not necessarily configured to face different directions. With reference to FIG. 9B, the first and second conductive members 360a and 360b are disposed together at the lower end of the terminal. A gap G2 may be formed between the first and second conductive members 360a and 360b, and the gap G2 may be filled by a filling member.

According to this structure, an externally integral design of the mobile terminal may be possibly obtained while radio signals of multiple frequency bands are transmitted and received at the lower end of the terminal.

Figure 10:
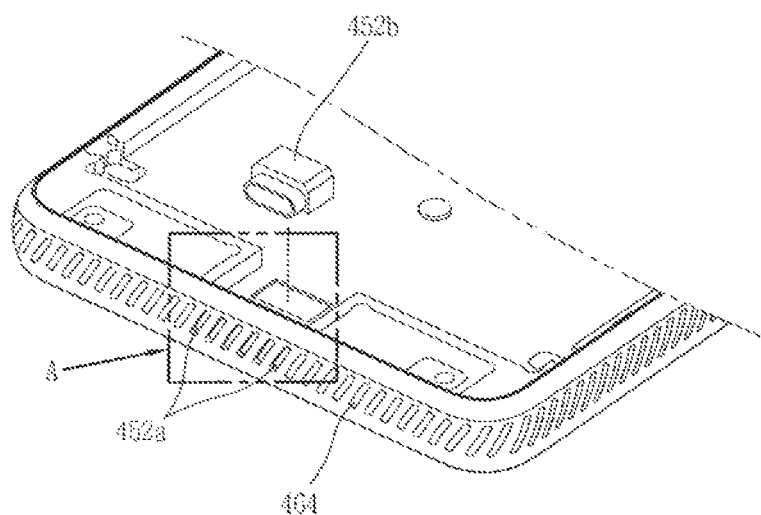
FIG. 10 is a conceptual view showing a mobile terminal related to another embodiment of the present invention.
Figure 11:
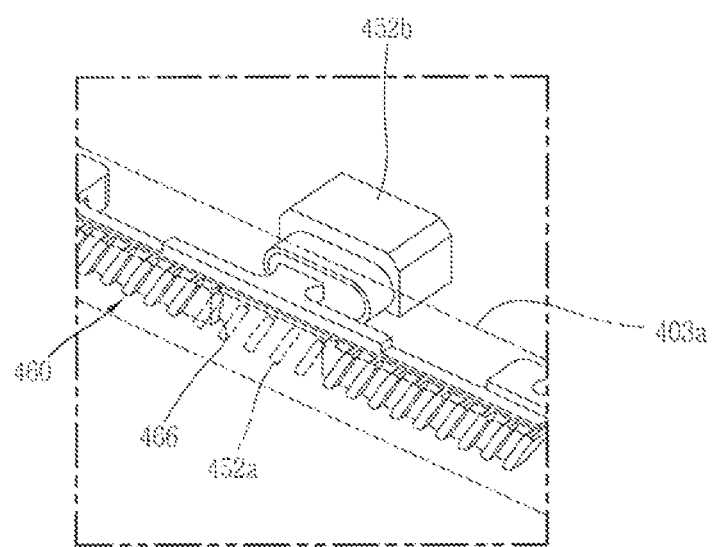
FIG. 11 is an enlarged view of a portion 'A' in FIG. 10.

FIG. 10 is a conceptual view showing a mobile terminal related to another embodiment of the present invention. FIG. 11 is an enlarged view of a portion 'A' in FIG. 10.

As illustrated, a filling member 403a includes a plurality of slots, and at least one of the plurality of slots is configured as a through hole 452a for discharging a sound. An audio output element, e.g., a speaker 452b, is disposed to be adjacent to the through hole 452a.

For example, a guide recess 466 for discharging a sound is formed at a portion corresponding to the through hole 452a of the conductive member 460, and the through hole 452a is disposed at a portion facing the guide recess 466 of the filling member 403a. The through hole 452a is formed to have the same size as that of the exposed surface 461 of the conductive member 460, and accordingly, the structure in which a sound is easily discharged while the externally united (or integral) design is maintained.

Figure 12:
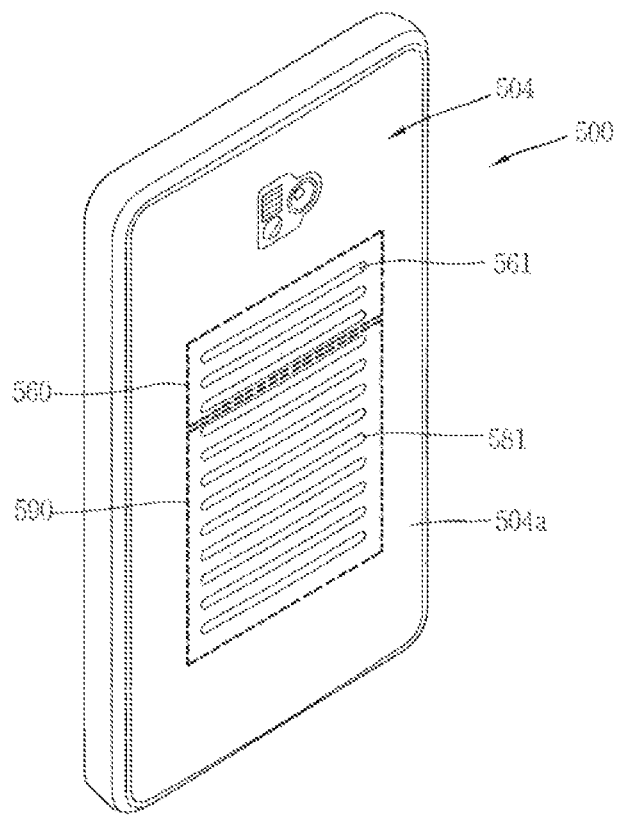
FIG. 12 is a conceptual view showing a mobile terminal related to another embodiment of the present invention.

FIG. 12 is a conceptual view showing a mobile terminal related to another embodiment of the present invention.

As illustrated, a conductive member 560 and a metal member 590 constitute a battery cover 504 along with a filling member 504a through in-mold molding.

The battery cover 504 is detachably mounted on the rear surface of the terminal, but the present invention is not necessarily limited thereto and the battery cover 504 may be configured as a rear case of the terminal.

The conductive member 560 is mounted on the battery cover 504, and an exposed surface 561 forms a pattern on the external surface of the battery cover 504. In general, the length of the conductive member 560 is set to transmit and receive radio signals. Thus, in order to form a consistent pattern on the entirety of the battery cover 504, the metal member 590 is disposed to be adjacent to the conductive member 560.

Metal exposed surfaces 581 of the metal member 590 and the exposed surfaces 561 of the conductive member 560 form groove patterns parallel to each other. However, the patterns formed on the battery cover 504 may be variably modified such as a shape of a comb pattern, or the like.

As a filling member fills a gap between the metal member 590 and the conductive member 560, the overall external appearance of the battery cover 504 is formed. Accordingly, a design in which the antenna pattern installed in the battery cover 504 is exposed to the outside but it is not discriminated from an external surface pattern of the battery cover 504 can be possibly obtained (namely, whether it is an antenna pattern is hardly recognizable).

In an embodiment of the present invention, since the conductive member of the antenna includes the exposed surface and the recess portions, the design in which the conductive member is disposed on the external surface of the terminal but an exposed portion thereof is limited can be implemented. Thus, the terminal can be designed to be thinner, and in addition, performance of transmission and reception of radio signals of the antenna can be enhanced.

Also, in an embodiment of the present invention, since the gap between the conductive member and the metal member is filled by the filling member along with the recess portions, the design in which the conductive member and the metal member are integrated in terms of external appearance can be provided.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a terminal main body including a circuit board configured to process a radio signal;
   a conductive member including an exposed surface and a plurality of recesses, wherein at least a portion of the conductive member is configured to transmit and receive the radio signal; and
   a filling member forming an external appearance of the main body and configured to fill the plurality of recesses, wherein the exposed surface is exposed external to an outer surface of the main body, and
   wherein the plurality of recesses are spaced apart and recessed from the exposed surface toward an interior of the main body.

2. The mobile terminal of claim 1, further comprising a metal member disposed on the main body to form a gap with the conductive member, wherein the filling member is further configured to fill the gap.

3. The mobile terminal of claim 2, wherein the metal member comprises:
   a metal exposed surface exposed external to the outer surface of the main body and formed such that it is continued from the exposed surface; and
   metal recess portions that are spaced apart and recessed from the metal exposed surface toward the interior of the main body.

4. The mobile terminal of claim 3, wherein the exposed surface and the metal exposed surface are each formed on the outer surface of the main body.

5. The mobile terminal of claim 3, wherein the filling member is further configured to surround both the conductive member and the metal member such that the plurality of recesses, the gap and the metal recess portions are filled.

6. The mobile terminal of claim 3, wherein the filling member includes a plurality of slots that are spaced apart along an outer circumference of the main body such that the exposed surface and the metal exposed surface are inserted into the slots.

7. The mobile terminal of claim 3, wherein the filling member includes a plurality of slots with at least one of the plurality of slots configured as a through hole for discharging sound.

8. The mobile terminal of claim 2, wherein:
   the metal member and the conductive member are made of a same material; and
   the filling member is made of a synthetic resin material.

9. The mobile terminal of claim 2, wherein the metal member and the conductive member are coupled to the filling member by in-mold molding.

10. The mobile terminal of claim 1, further comprising an antenna module installed within the main body, wherein the antenna module includes:
    a conductor connected to the circuit board; and
    a connection terminal connecting the conductor to the conductive member in order to provide a conductive path formed by the circuit board, the conductor and the conductive member.

11. The mobile terminal of claim 10, wherein:
    the antenna module further includes a carrier on which the conductor is mounted; and
    at least a portion of the carrier overlaps the conductive member.

12. The mobile terminal of claim 1, further comprising:
    a metal frame portion formed along a lateral surface of the main body; and
    an extending portion that extends from the frame portion to the interior of the main body.

13. The mobile terminal of claim 12, further comprising a recess that is recessed toward the interior of the main body, wherein the conductive member is disposed in the recess.

14. The mobile terminal of claim 12, wherein the extending portion is electrically connected to the circuit board in order to extend a ground of the circuit board.

15. The mobile terminal of claim 12, wherein the extending portion covers a rear surface of the main body in a thickness direction.

16. The mobile terminal of claim 12, further comprising at least one electronic element installed in the main body and mounted on the extending portion.

17. The mobile terminal of claim 1, wherein the conductive member comprises first and second conductive members for transmitting and receiving radio signals of different frequency bands, the first and second conductive members facing different directions.

* * * * *